United States Patent Office 3,467,698
Patented Sept. 16, 1969

3,467,698
OXIDATION OF ALKYL AROMATIC COMPOUNDS TO AROMATIC CARBOXYLIC ACIDS
Johann G. D. Schulz, Arthur C. Whitaker and Paolo Winteler, Pittsburgh, Pa., assignors to Gulf Research & Development Company, Pittsburgh, Pa., a corporation of Delaware
No Drawing. Filed Oct. 21, 1965, Ser. No. 500,271
Int. Cl. C07c 63/02, 63/26
U.S. Cl. 260—524                    5 Claims

ABSTRACT OF THE DISCLOSURE

Alkyl substituted aromatic compounds can be oxidized in a process whereby a mixture of the alkyl aromatic compound, lower aliphatic carboxylic acid, salt of a transition metal and a cyclohexane is contacted with molecular oxygen at an elevated temperature. p-Xylene can be converted to terephthalic acid.

This invention relates to a process for the catalytic oxidation of alkyl substituted aromatic compounds, more particularly to the catalytic oxidation of p-xylene to obtain terephthalic acid.

Briefly stated, our invention relates to an improvement in a process wherein an alkyl substituted aromatic compound is subjected to oxidation with molecular oxygen in a lower aliphatic acid solvent medium in the presence of a catalyst wherein the intention is to convert said alkyl substituent to a carboxylic acid substituent. We have found, in accordance with our discovery, that in order to facilitate the desired conversion to produce excellent yields of desired product aromatic acid, it is imperative that a cyclohexane compound be present in the defined reaction mixture.

The alkyl aromatic compound that is to be converted to product acid herein is one carrying at least one alkyl substituent thereon, preferably from two to four substituents thereon, wherein each of the alkyl substituents has from one to 12 carbons, preferably from one to four carbons, such as methyl, ethyl, propyl, iso-propyl, hexyl, octyl, iso-octyl, etc. The charge aromatic can also contain other substituents thereon which will not be adversely affected during the defined reaction, for example, chlorine, bromine, fluorine, nitro, tertiary alkyl, carboxyl, alkoxy, etc. Specific examples of alkyl aromatic compounds that can thus be employed as charge include toluene, o-xylene, m-xylene, p-xylene, ethyl-benzene, cumene, p-cymene, butyl-benzene, mesitylene, pseudocumene, hemimellitine, durene, prehnitene, iso-durene, di-amyl-benzene, 4-octyl-toluene, m-bromo-ethyl-benzene, o-nitro-hexyl-benzene, p-toluic acid, 1,4-dimethyl-2-methoxy-benzene, 1,1-bis-(p-tolyl)ethane, 1,1 - bis - (p - tolyl)hexane, 1,1-bis-(4-ethyl-phenyl)ethane, 1,1-bis-(3,4-dimethyl-phenyl)ethane, 1,1-bis-(3,4-dimethyl-phenyl)hexane, 1 - (4 - propyl-phenyl), 1-(2-ethyl-phenyl)octane, 1,1-bis-(2,2'-di-bromo-3,4,3',4'-tetramethyl-phenyl)ethane, 2,6 - dimethyl - naphthalene, 4,4'-dimethyl-biphenyl, etc. A preferred charge is p-xylene.

The reaction defined herein must be carried out in a solvent which will provide a single homogeneous phase for the reactants employed herein. For this purpose a lower aliphatic carboxylic acid, such as acetic acid, propionic acid, butyric acid, etc., is particularly desirable. Of these acetic acid is preferred as solvent. The amount of such solvent that must be employed is critical and must be sufficient to avoid a liquid phase separation of the materials charged to the reaction zone. Thus, the lower aliphatic acid employed must be sufficient to solubilize the alkyl aromatic charge, the catalyst (which will be defined hereinafter), the cyclohexane and water which is formed during the reaction in an amount corresponding to one mol for each molar equivalent of alkyl substituent on the alkyl aromatic converted to a carboxylic acid substituent. If sufficient solvent is not present to solubilize all of the water present in the reaction system at any particular moment, a two-phase liquid system will result, an upper organic phase containing unreacted alkyl aromatic compound and the cyclohexane and a lower aqueous phase containing dissolved catalyst. In such case, it is apparent that the desired reaction will be inhibited and will tend to cease. Accordingly, the amount of lower aliphatic carboxylic acid solvent required will amount to at least about three mols per mol of alkyl aromatic to be converted, preferably from about six to about 12 mols per mol of alkyl aromatic to be converted. This is based on the conversion of one alkyl substituent to one carboxylic acid substituent. Conversion of more than one alkyl substituent on the alkyl aromatic charge will, of course, require proportionately greater amounts of solvent.

The catalyst required is any metal salt of the transition metals soluble in the reaction mixture. By "transition metals" we intend to include vanadium, chromium, manganese, iron, cobalt, nickel, molybdenum, etc. Examples of such metal salts include cobaltous acetate tetrahydrate, cobaltous propionate, manganese naphthenate, chromium stearate, molybdenum octanoate, manganese caproate, etc. Of these, we prefer to employ the cobaltous salts. We believe that when the defined metal salt dissolves in the reaction mixture, it becomes a metal salt of the particular lower aliphatic carboxylic acid solvent being used, and it is the latter salt that is the effective catalyst herein. Desirably, the amount of catalyst employed is that amount sufficient to obtain a saturated solution thereof in the solvent, although lesser or greater amounts can be employed, if desired. The amount of catalyst employed is thus generally at least about 0.01 mol per mol of the alkyl aromatic charge, but preferably will be in the range of about 0.02 to about 2.25 mol per mol of said alkyl aromatic.

Any gas containing molecular oxygen, such as oxygen itself or air, can be employed in the oxidation procedure of this invention. Any means effective to obtain contact between the oxygen and the alkyl aromatic can be employed. This oxygen can be bubbled through the reaction mixture or, if desired, it can be introduced into the reaction mixture and the entire contents thereof can be vigorously stirred to obtain the desired contact. The amount of oxygen required is at least that amount stoichiometrically sufficient to convert the alkyl substituent on the aromatic ring of the charge to a carboxylic acid substituent, although greater or lesser amounts of oxygen can be used if desired. In order to facilitate the oxidation procedure, however, we prefer to employ from about two to about four times the molecular amount of oxygen stoichiometrically required.

As pointed out above, it is imperative that the reaction mixture described thus far also contains a cyclohexane in order to facilitate the desired conversion to produce excellent yields of desired product acid. This, in fact, becomes urgent when more than one alkyl substituent is present on the aromatic charge. The first alkyl substituent can be oxidized somewhat with difficulty, if a cyclohexane is not present, but it becomes almost impossible to oxidize additional alkyl substituents to caboxylic acid substituents. With a cyclohexane present, however, not only will oxidation of the first alkyl substituent be facilitated, but also additional alkyl substituents on the alkyl aromatic will be oxidized as desired. The cyclohexane employed can contain, if desired, other substituents that are inert under the conditions of the reaction, for example, chlorine, bromine, fluorine, nitro, tertiary alkyl, carboxyl, alkoxy, etc. Specific examples of cyclohexanes that can be employed are cyclohexane itself, methylcyclohexane, chloro-cyclohexane, nitro-cyclohexane, cyclohexane-carboxylic acid, phenyl-cyclohexane, etc. The amount of cyclohexane that can be employed corresponds to at least about 0.01 mol per mol of alkyl aromatic, preferably from about 0.1 to about 0.5 mol per mol of said alkyl aromatic.

The reaction conditions are important in order to carry out the present procedure effectively. Thus, the temperature can be as low as about 65° C. or as high as about 200° C., but with the catalyst system employed herein milder temperatures on the order of about 75° to about 110° C. are preferred. Pressure appears to have little or no influence on the course of the reaction. For such reason the pressure can be from about 0 to about 500 pounds per square inch gauge, but preferably is maintained in the range of about 0 to about 100 pounds per square inch gauge. At the lower temperatures, that is, from about 65° to about 140° C., there is an induction period which can be from about 18 hours at the lower temperature to but a few minutes at the higher temperature before there is appreciable conversion of the alkyl substituent on the charge to carboxylic acid. At temperatures above about 140° C. there is virtually no induction period. Upon completion of the induction period, the desired reaction begins. The length of the reaction period is dependent on the amount of conversion desired. A small amount of conversion to desired product is obtained within about one minute, although from six to 24 hours are needed for essentially complete conversion. In substantially no case, however, will it be necessary to extend the reaction time in excess of 48 hours.

At the end of the reaction period, the reaction mixture will contain solvent, unreacted alkyl aromatic, if any, the desired aromatic carboxylic acid, either in solution or as a precipitate, the cyclohexane and water. The water need not be removed from the reaction zone as it is being formed, provided, as previously noted, sufficient solvent is present to solubilize the same. If desired, however, substantially all or only a portion of the water can be removed from the reaction zone in any convenient manner. For example, during the course of the reaction an azeotrope can form composed of water and some of the alkyl aromatic, which can be removed overhead from the reaction zone. After removal of water from the azeotrope, the alkyl aromatic can be returned to the reaction zone. Alternatively, a dehydrating agent, such as molecular sieves, can be present in the reaction zone to remove some of the water of reaction. Additionally, acetic anhydride can be used in place of some of the acetic acid, when the latter is employed as solvent, to take up some water out of solution.

If the product aromatic acid is a solid and precipitation thereof occurs, it can be recovered from the reaction mixture by simple filtration. If, however, the product aromatic acid is soluble in the reaction mixture, it can be recovered therefrom in any convenient way. For Example, evaporation of the liquid contents at suitable conditions, for example, a temperature of about 20° to about 200° C. and a pressure of about 0.1 to about 760 millimeters of mercury is employed until the desired acid precipitates out of solution. Simple filtration, as before, is effective in recovering the desired aromatic acid.

Examples of aromatic acids that can be obtained herein include benzoic acid, o-toluic acid, m-toluic acid, p-toluic acid, o-phthalic acid, iso-phthalic acid, terephthalic acid, trimesic acid, trimellitic acid, pyromellitic acid, prehinitic acid, mellophanic acid, p-chloro-benzoic acid, m-bromo-benzoic acid, o-nitrobenzoic acid, 2-methoxy-terephthalic acid, benzophenone-dicarboxylic acid, benzophenone - 3,4,3',4' - tetra-carboxylic acid, benzophenone-2,2' - bromo - 3,4,3',4'-tetra-carboxylic acid, naphthalene-2,6-dicarboxylic acid, bi-phenyl-4,4'-dicarboxylic acid, etc. These acids can be used for the preparation of plastics, fibers, plasticizers and as curing agents.

The invention can further be illustrated by the following.

Example I

Through a mixture consisting of 35.4 grams of p-xylene and 8.0 grams of cobaltous acetate tetrahydrate dissolved in 315 grams of glacial acetic acid molecular oxygen was passed at a rate of 450 milliliters per minute. Throughout the reaction period a temperature of 90° C. and a pressure of 14 pounds per square inch gauge was maintained. After an induction period of 11 hours, some reaction occurred and the reaction was continued for an additional 11 hours. The total product was withdrawn from the reactor and diluted with two liters of water, which resulted in the separation of an upper organic layer and a lower aqueous layer. The two layers were separated from each other by decantation. The organic layer was filtered under suction, resulting in the recovery of 5.1 grams of a solid, which by neutral equivalent determination (134) was identified to be p-toluic acid. There was also recovered 31.0 grams of p-xylene. This amounts to a p-xylene conversion to p-toluic acid of 11.0 percent.

Example II

Through a mixture consisting of 35.4 grams of p-xylene, 8.0 grams of cobaltous acetate tetrahydrate dissolved in 315 grams of glacial acetic acid and 20 grams of cyclohexane, molecular oxygen was passed at the rate of 450 milliliters per minute. Throughout the reaction period a temperature of 90° C. and a pressure of 14 pounds per square inch gauge was maintained. After an induction period of 11 hours, reaction began and the reaction was continued for an additional nine hours. The total reaction product was withdrawn from the reactor and filtered. There was recovered 21.0 grams of solids which by neutral equivalent determination (85.2) was identified to be terephthalic acid. By dilution of the filtrate with water 18.5 grams of solids were recovered, which by neutral equivalent determination (137) was identified as p-toluic acid. There was also recovered 5.2 grams of unreacted p-xylene. This amounts to a conversion of 85 percent, with efficiency to terephthalic acid of 48.2 percent.

A comparison of Example I with Example II is revealing. In Example I only 5.1 grams of p-toluic acid were obtained. In Example II, however, which is otherwise identical with Example I, except that cyclohexane was present, and with a shorter reaction period, more than three times as much p-toluic acid was obtained than in Example I. In addition, 21.0 grams of terephthalic acid, which was not obtained in Example I, was also obtained in Example II.

Example III

The run of Example II was repeated, except that after the initial induction period of 11 hours, the reaction was permitted to continue for 34 hours. Conversion of p-xylene was complete. In this run, however, the amount of terephthalic acid obtained was twice as much as that obtained in Example II, specifically 42.7 grams. The amount of p-toluic acid obtained was reduced to 5.7 grams. Efficiency to terephthalic acid was therefore 87 percent.

It is apparent from Example III that at longer reaction time in the presence of cyclohexane substantially all of the alkyl substituents available for oxidation are converted to carboxylic acid groups.

Example IV

Through a mixture of 53.1 grams of p-xylene, 12.45 grams of cobaltous acetate tetrahydrate dissolved in 450 milliliters of glacial acetic acid and 8.4 grams of cyclohexane, molecular oxygen was passed at the rate of 30 milliliters per minute. Throughout the reaction period, the temperature was maintained in the range of 90° to 100° C. and atmospheric pressure. After a period of 11 hours, reaction began and the reaction was continued for an additional 11 hours. From the reaction product there was recovered 13.5 grams of terephthalic acid. The remainder of the reaction mixture was subjected to reaction conditions for an additional 24 hours, at the end of which time 24.5 more grams of terephthalic acid were produced. The reaction was continued with the remainder of the reaction mixture for additional 18 hours, and a third crop of 13.5 grams of terephthalic acid was recovered. The total amount of terephthalic acid recovered amounted to 53.5 grams. There was also recovered 20.2 grams of p-toluic acid and 3 grams of p-xylene. This amounts to a conversion of 94.1, with an efficiency to terephthalic acid of 68.3 percent.

Although elevated temperatures are not preferred herein, improved results are nevertheless obtained when the defined reaction is carried out in the presence of a cyclohexane. This is shown below in Examples V and VI, wherein the presence of cyclohexane in Example VI shows that not only are increased conversions of alkyl aromatic obtained but also greater amounts of the more highly oxidized product acid.

Example V

Through a mixture of 35.4 grams of p-xylene and 8.0 grams of cobaltous acetate tetrahydrate dissolved in 315 grams of glacial acetic acid air was passed at a rate of 450 milliliters per minute. Throughout the reaction period the temperature was maintained at 140° C. and the pressure at 80 pounds per square inch gauge. There was no induction period and the reaction was permitted to go for six hours. Using the same recovery procedures defined above, there was obtained 3.5 grams of terephthalic acid and 27.5 grams of p-toluic acid. Conversion of p-xylene was 68.4 percent, with efficiency to terephthalic acid of 9.3 percent.

Example VI

The run of Example V was repeated, except that 20.0 grams of cyclohexane was added to the reaction mixture. There was recovered 7.4 grams of terephthalic acid, more than twice that obtained in Example V, and 30.0 grams of p-toluic acid. Conversion of p-xylene was increased to 79.4%. Efficiency to terephthalic acid amounted to 16.7 percent. Increased reaction time would increase further the efficiency to terephthalic acid.

We have analyzed the liquids obtained above by gas chromatography and have not detected any oxidation products of cyclohexane. Similarly, qualitative analysis of the solids recovered above has failed to detect the presence of adipic acid therein.

Obviously, many modifications and variations of the invention as hereinabove set forth can be made without departing from the spirit and scope thereof and therefore only such limitations should be imposed as are indicated in the appended claims.

We claim:

1. A process for oxidizing each of the alkyl substituents on xylene which comprises subjecting a mixture consisting essentially of said xylene, a lower aliphatic carboxylic acid, a metal salt of a transition metal and cyclohexane to the action of molecular oxygen at an elevated temperature.

2. The process of claim 1 wherein said xylene is p-xylene, said carboxylic acid is acetic acid, said metal salt is a cobalt salt soluble in acetic acid.

3. The process of claim 2 wherein said xylene is p-xylene, said carboxylic acid is acetic acid, said metal salt is a cobalt salt soluble in acetic acid, and said temperature is within the range of about 65° to about 200° C.

4. The process of claim 2 wherein said xylene is p-xylene, said carboxylic acid is acetic acid, said metal salt is cobaltous acetate, and said temperature is within the range of about 65° to about 200° C.

5. The process of claim 4 wherein there is present at least about three mols of acetic acid per mol of p-xylene, at least about 0.1 mol of cobaltous acetate per mol of p-xylene, and at least about 0.01 mol of cyclohexane per mol of p-xylene.

References Cited

UNITED STATES PATENTS

| 2,245,528 | 6/1941 | Loder | 260—524 |
| 3,036,122 | 5/1962 | Ardis et al. | 260—524 |

FOREIGN PATENTS 961,061  6/1964  Great Britain.

LORRAINE A. WEINBERGER, Primary Examiner

R. WEISSBERG, Assistant Examiner

UNITED STATES PATENT OFFICE
CERTIFICATE OF CORRECTION

Patent No. 3,467,698                            September 16, 1969

Johann G. D. Schulz et al.

It is certified that error appears in the above identified patent and that said Letters Patent are hereby corrected as shown below:

Column 2, line 38, "2.25" should read -- 0.25 --.

Signed and sealed this 12th day of May 1970.

(SEAL)
Attest:

Edward M. Fletcher, Jr.                        WILLIAM E. SCHUYLER, JR.
Attesting Officer                                    Commissioner of Patents